US006778819B2

(12) United States Patent
Sumino (10) Patent No.: US 6,778,819 B2
(45) Date of Patent: Aug. 17, 2004

(54) PORTABLE TELEPHONE APPARATUS THAT IMPROVES THE CONVENIENCE OF INTERNATIONAL ROAMING

(75) Inventor: Morihiko Sumino, Kobe (JP)

(73) Assignee: Sanyo Electric Co., Ltd., Osaka-fu (JP)

(*) Notice: Subject to any disclaimer, the term of this patent is extended or adjusted under 35 U.S.C. 154(b) by 554 days.

(21) Appl. No.: 09/816,123

(22) Filed: Mar. 26, 2001

(65) Prior Publication Data

US 2001/0027108 A1 Oct. 4, 2001

(30) Foreign Application Priority Data

Mar. 28, 2000 (JP) .................................. 2000-089524

(51) Int. Cl.⁷ .............................................. H04Q 7/20
(52) U.S. Cl. ................... 455/412.1; 368/10; 455/432.1
(58) Field of Search ..................... 455/432.1, 432.2, 455/432.3, 433, 435.1, 435.2, 426.1, 455, 414.2, 414.3, 412.1, 412.2, 413; 368/10, 21, 22; 340/7.51, 7.52, 7.55

(56) References Cited

U.S. PATENT DOCUMENTS

| | | | | |
|---|---|---|---|---|
| 5,497,508 A | * | 3/1996 | George | 455/161.2 |
| 5,818,920 A | * | 10/1998 | Rignell et al. | 379/211.02 |
| 6,075,992 A | * | 6/2000 | Moon et al. | 455/455 |
| 6,192,007 B1 | * | 2/2001 | Aoshima | 368/10 |
| 6,587,688 B1 | * | 7/2003 | Chambers et al. | 455/433 |
| 2003/0073428 A1 | * | 4/2003 | Yamamoto | 455/414 |

FOREIGN PATENT DOCUMENTS

| | | |
|---|---|---|
| JP | 11-243583 | 9/1999 |
| JP | 11-308649 | 11/1999 |

OTHER PUBLICATIONS

"Mobile Station–Base Station Compatibility Standard for Dual–Mode Wideband Spread Spectrum Cellular System," TIA/EIA Interim Standard, TIA/EIA/IS–95–A, May 1995, Telecommunications Industry Association.

* cited by examiner

Primary Examiner—Vivian Chin
Assistant Examiner—Sanh Phu
(74) Attorney, Agent, or Firm—Arent Fox PLLC (57) ABSTRACT

A portable telephone apparatus that can recognize which country it is located in and alert the user to the appropriate operations for use in that country. In this portable telephone apparatus, a country name storage unit 2 stores names of a plurality of countries and their corresponding time differences in regard to a predetermined area. If a reception signal is received from a base station, the LTM_OFF field showing the time difference of the area in which the base station is located can be read from the received Sync channel message. The country name corresponding to the time difference closest to the read LTM_OFF field is retrieved from the country name storage unit 2 and displayed on an LCD 21.

4 Claims, 9 Drawing Sheets

COUNTRY NAME STORAGE UNIT CONTENTS

| COUNTRY NAME | TIME DIFFERENCE INFORMATION |
|---|---|
| UNITED KINGDOM | 0 : 00 |
| GERMANY | + 1 : 00 |
| FRANCE | + 1 : 00 |
| IRAN | + 3 : 30 |
| RUSSIA (MOSCOW) | + 3 : 00 |
| THAILAND | + 7 : 00 |
| PHILIPPINES | + 8 : 00 |
| CHINA | + 8 : 00 |
| JAPAN | + 9 : 00 |
| SOUTH KOREA | + 9 : 00 |
| AUSTRALIA (SYDNEY) | +10 : 00 |
| BRAZIL | − 3 : 00 |
| ARGENTINA | − 3 : 00 |
| NEW YORK | − 5 : 00 |
| SAN FRANCISCO | − 8 : 00 |
| HONOLULU | −10 : 00 |
| ⋮ | ⋮ |

STATE TRANSITION MAP

FIG. 5

SYNC CHANNEL MESSAGE

| Field | Length(bits) |
|---|---|
| MSG_TYPE("00000001") | 8 |
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| RESERVED | 3 |

PORTABLE TELEPHONE APPARATUS THAT IMPROVES THE CONVENIENCE OF INTERNATIONAL ROAMING

FIELD OF THE INVENTION

The present invention relates to a portable telephone apparatus that controls wireless communication through a base station installed in a mobile phone system.

DESCRIPTION OF THE BACKGROUND ART

In recent years mobile phone infrastructure has been developed in industrialized nations such as Japan, the US and European countries, as well as various other countries around the world.

Time Division Multiple Access (TDMA), Frequency Division Multiple Access (FDMA), and Code Division Multiple Access (CDMA) are examples of systems generally used in wireless communication. CDMA is thought to have potential as it has superior multipath phasing measures and allows better communication in built up areas.

The CDMA mobile phone system was developed by the US company Qualcomm. After being adopted as US standard IS95 in 1993, the system came into mainstream use and is now employed in numerous countries including Hong Kong (since September 1995) and South Korea (since January 1996). Meanwhile, the IS95 standard was revised to IS95A and then to IS95B. Japan employs a mobile phone system ARIB STD-T53 (commonly known as T53) that conforms with IS95A.

As mobile phone system infrastructure is improved in various countries, the appearance of portable telephones that are capable of international roaming is anticipated.

A portable telephone apparatus capable of international roaming can be used in a first country, and, when taken from the first country to a second country, can also be operated in the second country. Here, it is possible that a portable telephone apparatus compatible with the US IS95 system could also be used in Hong Kong and South Korea, and thus so-called international roaming could be performed between the US and Hong Kong and the US and South Korea. This is because Hong Kong and South Korea use the same IS95 system as the US, meaning that providing a portable telephone apparatus performs processes compatible with IS95, communication can take place with the mobile phone system in any of these countries.

However, in such international roaming, when a portable telephone apparatus is taken to a second country, there are cases in which the user of the portable telephone apparatus desires to be warned prior to use in the second country. That is to say, when the operation of types of communication services such as call charge billing, e-mail and the Internet is different between the first and second countries, it is desirable to have some way to notify the user that the country has changed and have the user carry out the appropriate settings for use in the second country. However, conventional portable telephone apparatuses have no mechanism for recognizing which country they are in, and so are unable to warn the user that changing of settings is necessary.

SUMMARY OF THE INVENTION

The object of the present invention is to provide a portable telephone apparatus that can recognize which country it is located in, and prompt the user to perform the appropriate operations for use in that country.

The portable telephone apparatus of the present invention as explained above includes: a country information storage unit having a plurality of pieces of country information for a plurality of countries, each piece of country information corresponding to a time difference for each of the plurality of countries with reference to a predetermined time zone; a reception unit for receiving a message generated by a base station; a reading unit for reading from the received message a local offset showing a time difference for an area in which the base station is located; and a display unit for retrieving a piece of country information corresponding to a time difference closest to the read local offset from the country information storage unit, and displaying the retrieved one.

With the stated construction the user can make the necessary settings for use in a second country. If these settings are performed correctly it becomes possible to use the portable telephone apparatus in the second country even if various communication services such as call charge billing, e-mail and the Internet are different between the two countries. In this way international roaming is realized.

Here the portable telephone apparatus may include: a receiving unit for receiving, when two or more pieces of country information are displayed by the display unit, a selection operation from a user to select one; and the updating unit may update the piece of information stored in the operation country storage unit, with the one piece of country information selected by the operator.

With the stated construction a portable telephone apparatus requests the country of operation from the user when it is not possible to specify in which country of a plurality of countries on the same longitude the portable telephone apparatus is located. As a result, the accuracy of the country information displayed by the display means can be improved.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
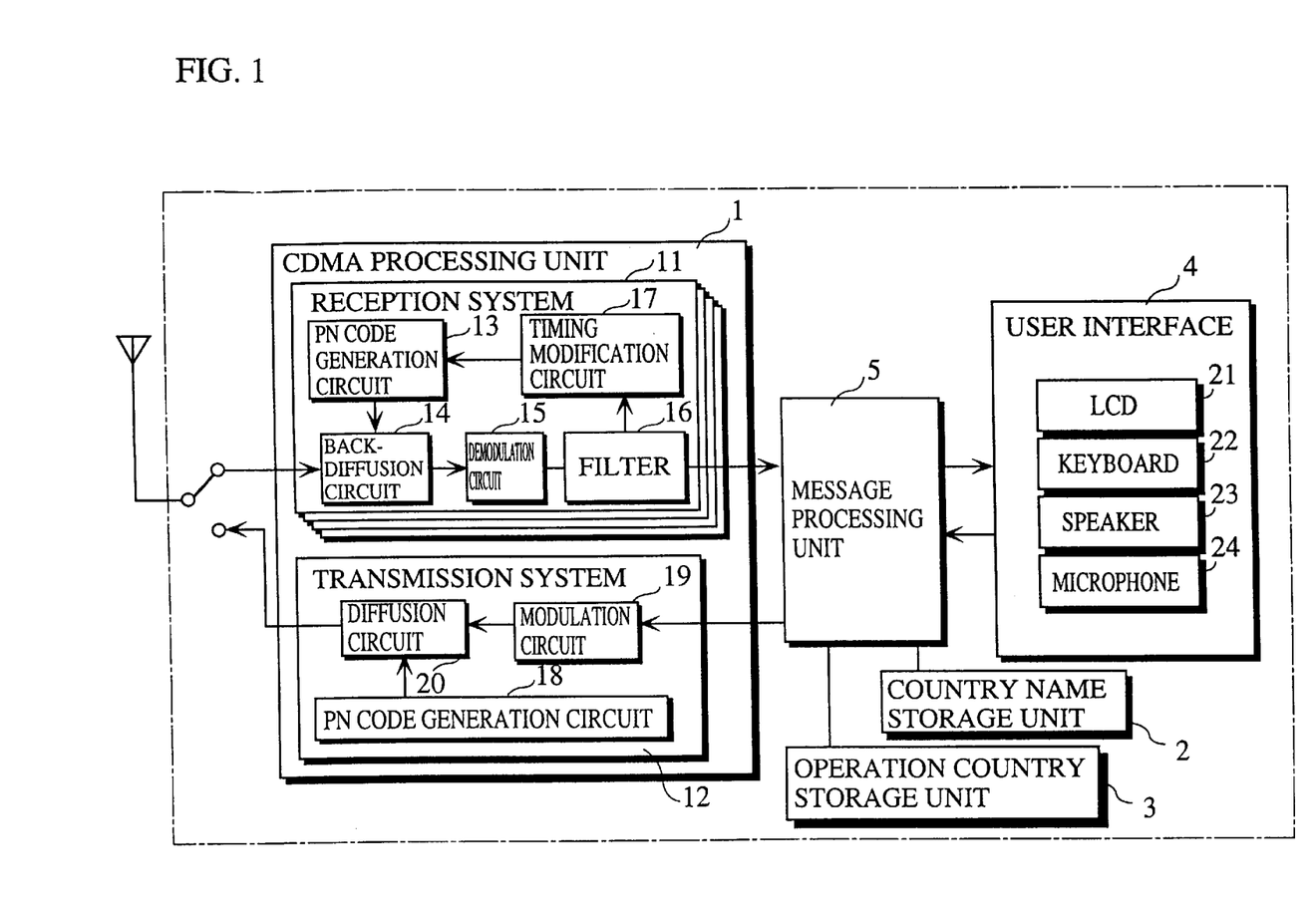
FIG. 1 is a view of the inner construction of a portable telephone apparatus in an embodiment of the present invention.

FIG. 1 shows an internal structure of a portable telephone apparatus in the present embodiment. The portable telephone apparatus includes a CDMA processing unit 1, a country name storage unit 2, an operation country storage unit 3, a user interface 4, and a message processing unit 5.

The CDMA processing unit 1, which transmits and receives messages to and from a base station, includes 4 to 5 CDMA reception systems 11, and one transmission system 12.

Each CDMA reception system 11 includes a PN (pseudo-noise) code generation circuit 13, a back-diffusion circuit 14, a demodulation circuit 15, a filter 16, and a timing modification circuit 17. The PN code generation circuit 13 generates PN code sequences. The back-diffusion circuit 14 performs back-diffusion by hybridizing reception signals induced by an antenna with a generated PN code sequence. The demodulation circuit 15 performs linear demodulation on back-diffused reception signals to obtain messages generated by a base station. The filter 16 passes only decoded signals with specific waveband components. The timing modification circuit 17 performs synchronous acquisition of the base station by instructing the PN code generation circuit 13 of modifications in the timing of PN code sequence generation, in accordance with the amplitude of signals output from the filter 16. The 4 to 5 reception systems 11, collectively called a "finger", receive radio waves and multipath from a plurality of base stations.

The CDMA transmission system 12 includes a PN code generation circuit 18, a modulation circuit 19, and a diffusion circuit 20. The PN code generation circuit 18 generates PN code sequences. The modulation circuit 19 performs linear modulation of output signals (messages) to be outputted to a base station. The diffusion circuit 20 performs diffusion on output signals that have been subject to linear modulation by hybridizing each signal with a PN code sequence, and then transmitting the hybridized signal via the antenna to a base station.

Figure 2:
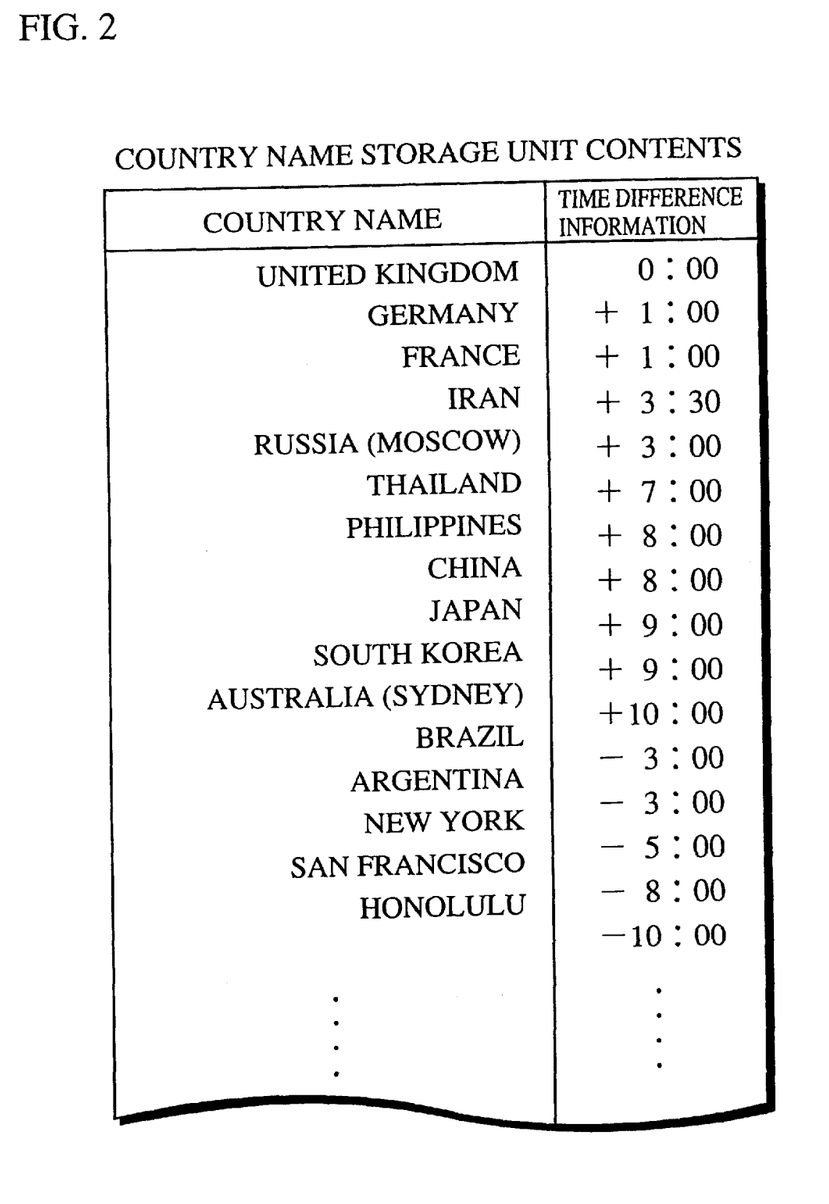
FIG. 2 shows an example of the storage contents of the country name storage unit 2.

The country name storage unit 2, as shown in FIG. 2, stores pieces of information about a plurality of countries (hereafter "country information") in correspondence with their time differences in respect to a predetermined time zone (hereafter "time difference information"). The country information includes information such as a name, an abbreviated name, and a symbol for each country (in the present embodiment, for simplicity, the country information consists of names of countries, hereafter "country name(s)"). Countries in which CDMA is employed are included in the plurality of countries described in the country information (country names) in the country name storage unit 2. If the present portable telephone apparatus is located in such countries, the CDMA processing unit 1 is able to transmit and receive messages with the mobile phone system employed in that country.

The pieces of time difference information show the time differences of each of the plurality of countries in respect to a predetermined time zone. The time difference information used in the present embodiment is based on the generally held understanding of time difference as a difference between the standard time in a particular country and Greenwich Mean Time (GMT). In Japan, for example, "9:00" means the difference in time between Japan Standard Time and GMT.

The country name storage unit 2, as shown in FIG. 2., stores, in addition to Japan, country names of countries such as Germany, France and Iran and their respective time differences "+1:00", "+1:00", and "+3:30". Any country name can be retrieved from the time difference information. A country name retrieved in this fashion is set in the operation country storage unit 3 as the country in which the portable telephone apparatus is being operated (hereafter "operation country").

Furthermore, the country name storage unit 2 stores 2 or more countries that are on approximately the same latitude in correspondence with the same time difference information, as in the example shown in FIG. 2 of "Japan" and "South Korea" which both have a corresponding time difference "9:00". The same is true for "China" and the "Philippines" which have a same corresponding time difference information "8:00". In such cases, if a particular time difference is used to retrieve a country name from the country name storage unit 2, the names of 2 or more countries that are on approximately the same longitude will correspond to the time difference, and the country in which international roaming is taking place will not be indicated.

In the present embodiment, the names of 2 or more countries amongst the plurality of countries stored in the country name storage unit 2 that are on approximately the same longitude are treated as candidates for the operation country (hereafter "operation country candidate(s)"). A display displays a list of these candidates and the portable telephone apparatus has the correct operation country selected by having the user select the country in the list in which roaming is taking place.

The operation country storage unit 3 stores one of the plurality of countries stored in the country name storage unit 2 as the operation country. Each time international roaming takes place, the country name stored in the operation country storage unit 3 is updated by searching the country name storage unit 2 using the above process.

The user interface 4 includes a liquid crystal display (LCD) 21 for displaying character strings and symbols, a keyboard 22 for receiving operations from the user, a speaker 23, and a microphone 24.

Figure 3:
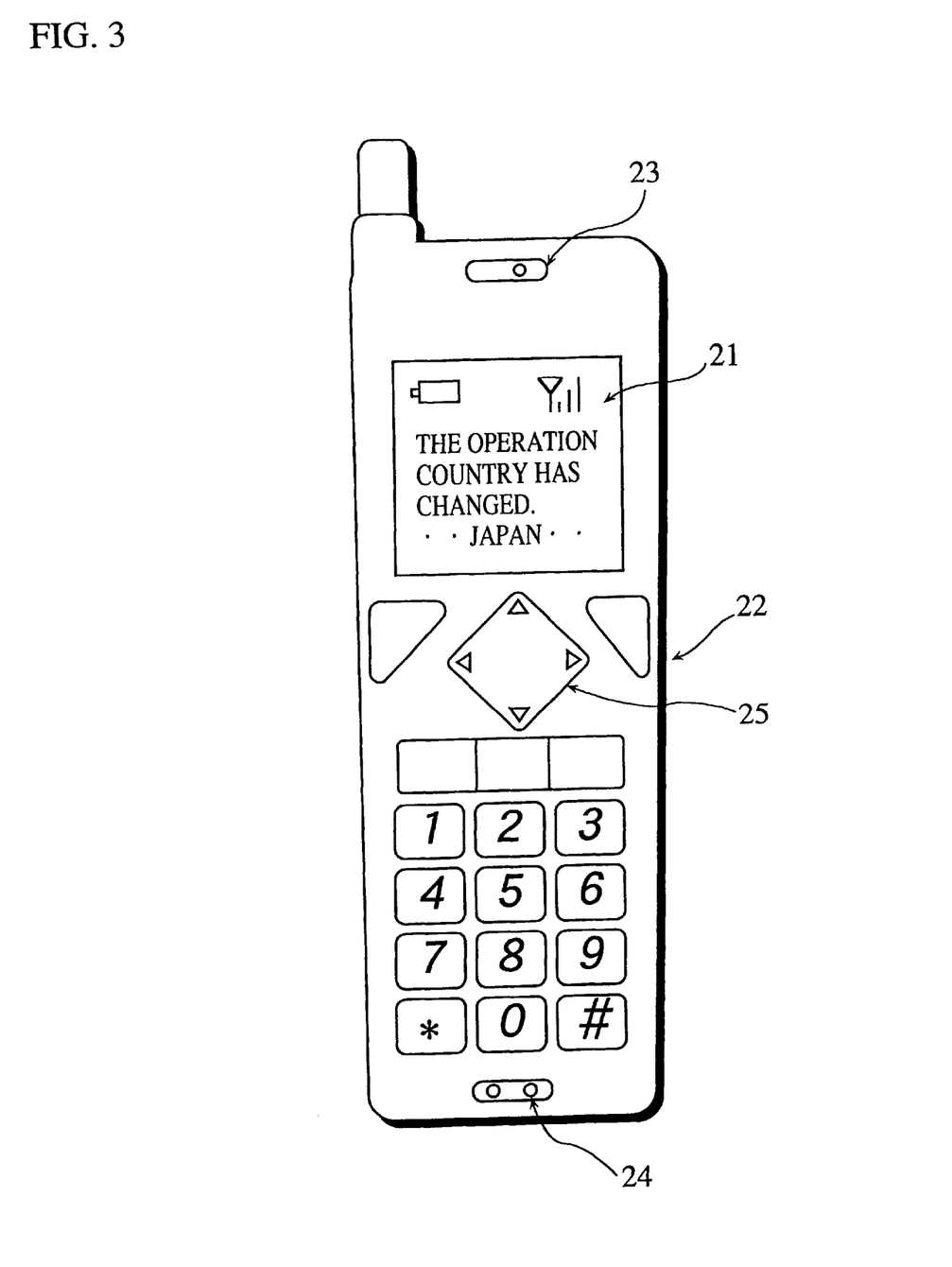
FIG. 3 shows an external view of a portable telephone apparatus.

FIG. 3 shows an external view of a portable telephone apparatus. In the drawing the LCD 21 is used to display the operation country (in this example "Japan") from the plurality of country names stored in the country name storage unit 2, and a notification of a change in operation country (in this example a character string "The operation country has changed.").

The LCD 21 is also used to display the list of the operation country candidates when there is a plurality of countries in the country name storage unit 2 that may be the operation country.

The keyboard unit 22 includes a plurality of keys such as a cross-shaped cursor key 25, number keys 0 to 9, a symbol key, and a * symbol key. The cursor key 25 is used to select the operation country when a plurality of country names in the country name storage unit 2 are displayed on the LCD 21 as operation country candidates. Any one of the number keys, the # symbol key, or the * symbol key can be used as a so-called "enter key". When one of the operation country candidates is selected using the cursor key 25, the enter key is used to receive a predetermined operation to set the selected candidate as the operation country.

The speaker 23 and the microphone 24 are held against the ear and mouth respectively of the user when the user uses the portable telephone apparatus.

Figure 4:
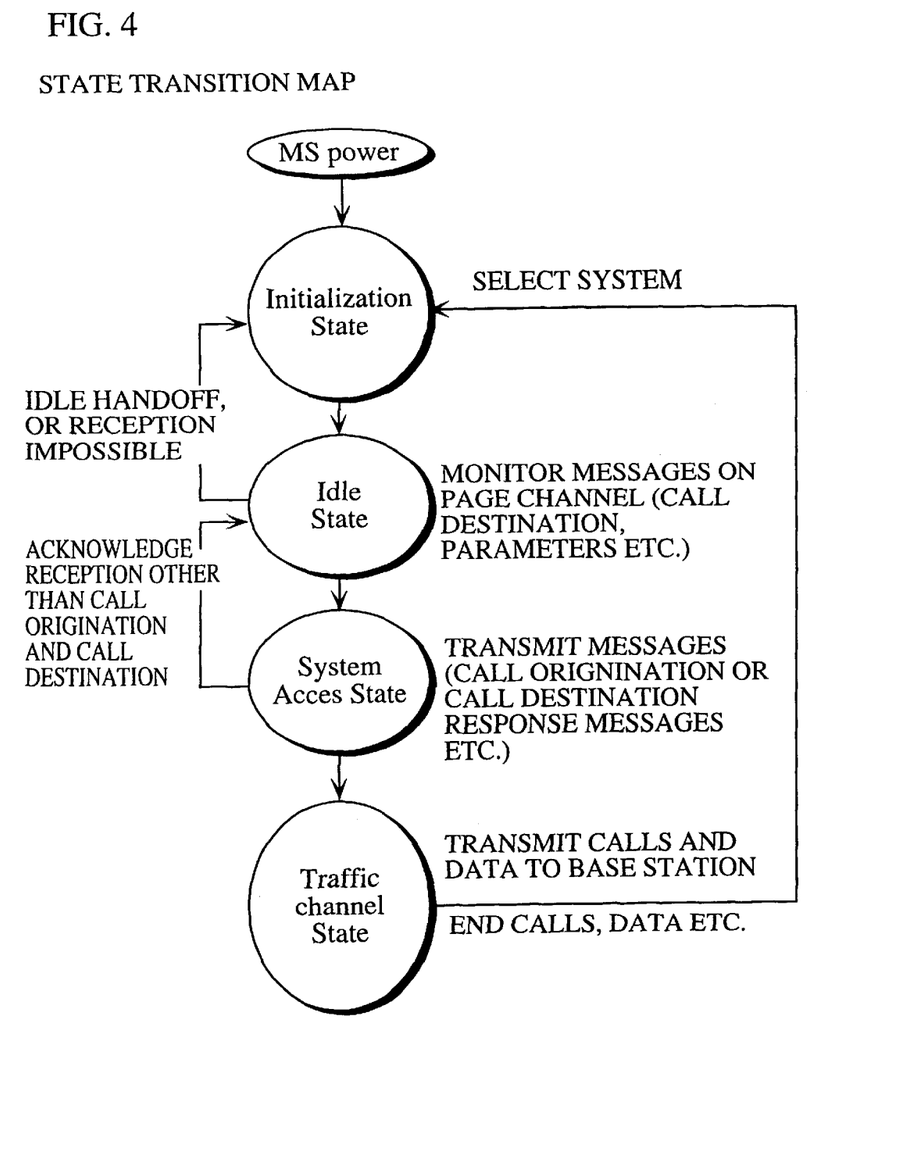
FIG. 4 shows an outline of state transition in a portable telephone apparatus.

The message processing unit 5 performs state transition as shown in FIG. 4 from the Initialization state to the traffic channel state and performs overall control of messages transmitted and received via the CDMA processing unit 1, according to messages transmitted from a base station and operations of the user interface 4 performed by the user.

A feature of the present embodiment is that in the Initialization state the message processing unit 5 uses information contained in a Sync channel message to search the operation country storage unit 3, updates the operation country stored in the operation country storage unit 3, and has the new operation country displayed on the LCD 21.

In the Initialization state the portable telephone apparatus finds as many base stations as possible that have a radiowave that can reach the portable telephone apparatus, and selects one with a reception field strength that is of at least a predetermined level. When a base station has been selected, the portable telephone apparatus uses a sync channel message sent from the base station to perform synchronous acquisition, and shifts to an idle state.

Figure 5:
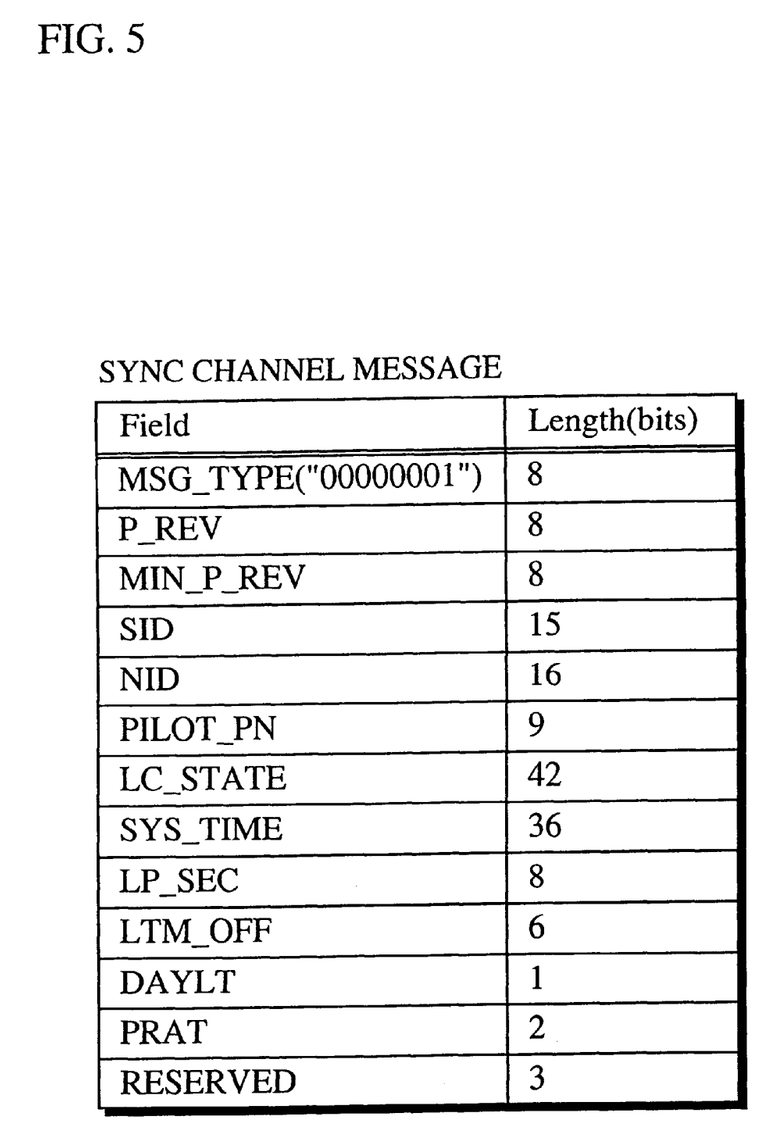
FIG. 5 shows a data format of a sync channel message.

The body format of the sync channel message is shown in FIG. 5. The Sync channel includes various information such as a SYS_TIME field, a LP_SEC field, and a LTM_OFF field.

The system time is set in the SYS_TIME field. The base station sets, with an 80 msec precision, GMT in the SYS_TIME field after 4 superframes have past following the end of a superframe including a part of the Sync channel message.

The LP_SEC field sets a leap time (a time offset for adjusting the calendar) from the start of the SYS_TIME field.

The LTM_OFF field sets the offset from the SYS_TIME in 30 minute units.

Using the SYS_TIME field, the LP_SEC field and the LTM_OFF field the local time at the base station can be obtained by calculating SYS_TIME-LP_SEC+LTM_OFF. Of these fields, the LTM_OFF field indicates the time difference between Greenwich in the United Kingdom and the country (or area) where the base station is found. Therefore, in the present embodiment, the LTM_OFF field is used in searching the country name storage unit 2 as the time difference of the current position of the portable telephone apparatus.

Figure 6:
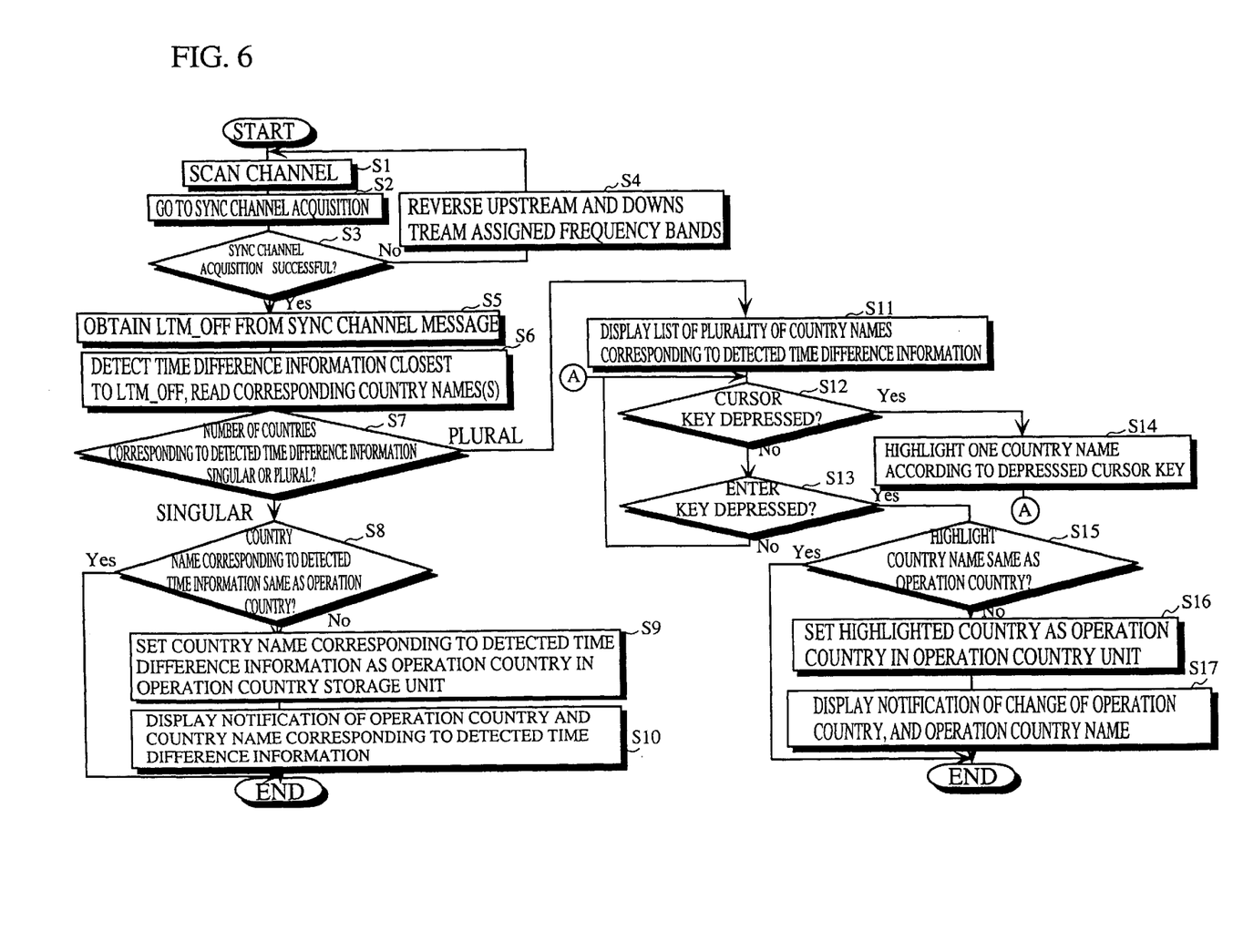
FIG. 6 is a flowchart showing the process performed when detecting a country name, updating an operation country, and displaying an operation country.

The series of processes that take place from the search of the country name storage unit 2 through to the update of the operation country and then the display of the operation country are shown in the flowchart in FIG. 6.

FIG. 6 shows a flowchart of the series of processes when detecting a change in country name, updating the operation country and displaying the operation country in the Initialization state. Two cases will be used to explain how the present message processing unit performs processing, with reference to the flowchart in FIG. 6. In the first case (hereafter "Case 1") "Japan" is set as the operation country and the offset time in the Sync channel message LTM_OFF field is written as "−5:00". In the second case (hereafter "Case 2") the operation country is also set as "Japan" but the offset time in the Sync channel message LTM_OFF field is written as "9:00".

At step S1 the message processing unit 5 performs a Sync channel scan of the downstream frequency band in the mobile phone system, and in step S2 the message processing unit 5 acquires the Sync channel. In step S3 the message processing unit 5 judges whether acquisition of the Sync channel has been successful. If the judgement is positive, the message processing unit 5 proceeds to step S5. If the judgement is negative the message processing unit 5 reverses the assigned frequency bands of the downstream and upstream channels, moves back to step S1, and repeats the above acquisition process.

The reason for this reversing of the assigned frequency channel is that the downstream and upstream assigned frequency bands of the IS95 system communication protocol used in the US, South Korea and Hong Kong are the opposite of those in the T53 system communication protocol used in Japan. In T53 a frequency of 825.030 MHz is assigned to the upstream channel, while a frequency of 870.030 MHz is assigned to the downstream channel. In IS95 a frequency of 870.030 MHz is assigned to the upstream channel, while a frequency of 825.030 MHz is assigned to the downlink channel. The sync channel message mentioned above is transmitted at 870.030 MHz in the T53 mobile phone system and at 825.030 Mhz in the IS95 mobile phone system. At steps S1 to S4 both assigned frequency bands are scanned, enabling acquisition of the base station in international roaming.

At step S5, the message processing unit 5 obtains the LTM_Off from the Sync channel message. At step S6, the message processing unit 5 finds the time difference information in the country name dictionary storage unit 2 that is closest to the LTM_OFF and retrieves the corresponding country name.

In Case 1 an offset time of "−5:00" is written in the Sync channel message LTM_OFF obtained at Step 5. Therefore the time difference information "−5:00" in the country name storage unit 2 matches the LTM_OFF field, and the country name corresponding this time difference information, "United States", is retrieved.

At step S7 the message processing unit 5 judges whether there is one country name, or a plurality of country names corresponding to the time difference information that has been detected. In Case 1, where the LTM_OFF field is written as "−5:00", the only country name corresponding to "−5:00" in the country name storage unit 2 is "United States", so the message processing unit 5 moves from step S7 to step S8.

At step S8, the message processing unit 5 judges whether the country name corresponding to the time difference information detected is the same as the operation country. If the judgement is negative, the message processing unit 5 proceeds on to step S9. If the judgement is positive steps S9 and S10 are skipped and the processing shown in the flowchart ends.

In Case 1 the country name United States corresponding to the detected information does not match the operation country "Japan", so the message processing unit 5 moves to step S9.

At step S9 the message processing unit 5 sets the country name corresponding to the time difference information detected in the operation country storage unit 3 as the operation country.

Figure 7:
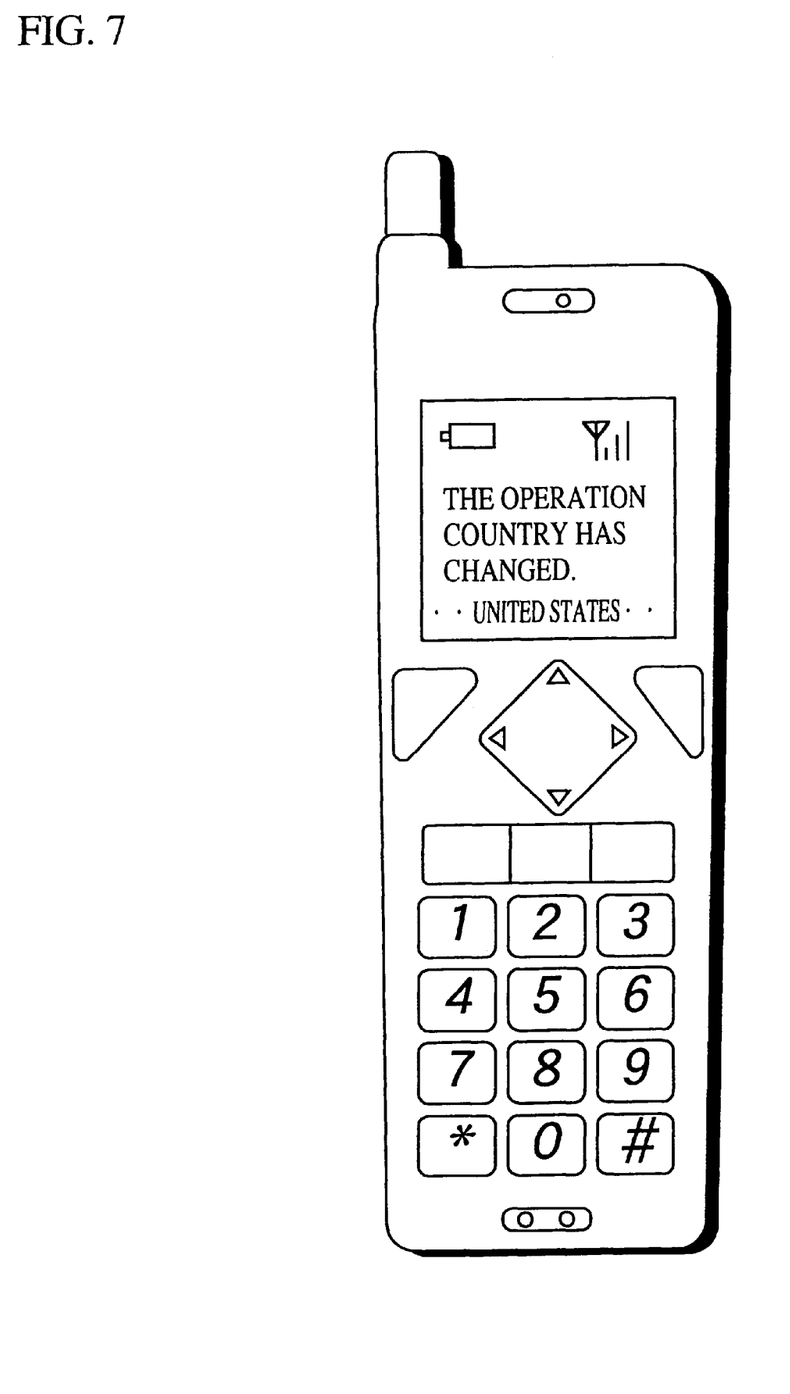
FIG. 7 shows a display example when a portable telephone apparatus is taken to the United States.

At step S10 the message processing unit 5 displays on the LCD 21 notification that the operation country has changed and a country name corresponding to the detected time difference information. FIG. 7 shows a display for a portable telephone taken to the US. The country name "United States" is displayed along with the character string "The operation country has changed."

This completes the display of the country name in Case 1. Next the display of the country name in Case 2 will be explained.

In Case 2 an offset time of "9:00" is written in the Sync channel message LTM_OFF obtained at Step 5. Therefore the time difference information "9:00" in the country name storage unit 2 matches the LTM_OFF field, and the country names corresponding to this time difference information, "Japan" and "South Korea", are retrieved.

At step S7 the message processing unit 5 judges whether there is one country name or a plurality of country names corresponding to the time difference information that has been detected. In Case 2 there is a plurality of country names so the message processing unit 5 proceeds to step S11 and displays a list of the plurality of country names corresponding to the detected time difference information.

Figure 8A:
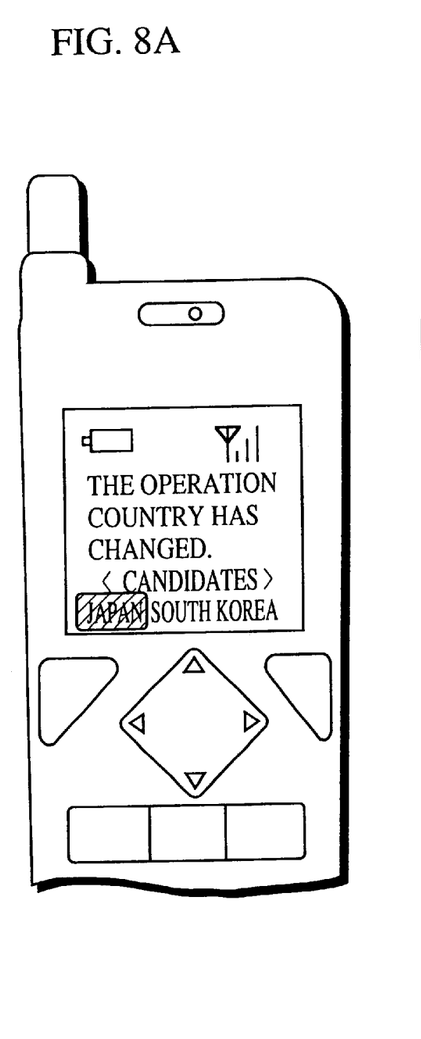
FIG. 8A shows a display example of a list of operation country candidates.

FIG. 8A shows an example of how a list is displayed when there are two candidate countries, "Japan" and "South Korea", corresponding to the time difference information "9:00". The country name "Japan" is highlighted.

After such a list is displayed, the message processing unit 5 moves to a wait operation loop of steps S12 to S13. If the portable phone is operated using the cursor key 25, the result of step S12 is 'yes' and the message processing unit 5 moves to step S14.

Figure 8B:
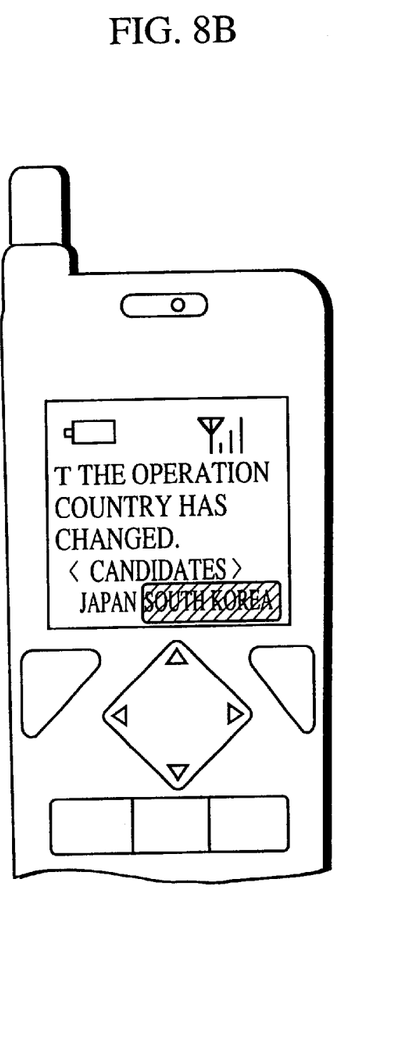
FIG. 8B shows a display example of a display of a list of operation country candidates.

At step S14, the message processing unit 5 highlights one of the country names according to the depressed cursor key 25. FIG. 8B shows an example of the display in FIG. 8A in when the cursor key 25 is pressed. If the cursor key 25 is pressed the highlighting of "Japan" is cancelled and "South Korea" is highlighted instead.

If an enter key operation is performed on the portable telephone in the wait operation loop in steps S12 to S13, the result of step S13 is 'yes' and the message processing unit 5 moves to step S15.

At step S15 the message processing unit 5 judges whether the highlighted country name is the same as the operation country. If the judgement is positive, the message processing unit 5 sets the highlighted country name as the operation country in the operation country storage unit 3 (step S16) and the LCD 21 displays notification that the operation country has changed along with the new operation country name (step S17).

Figure 9A:
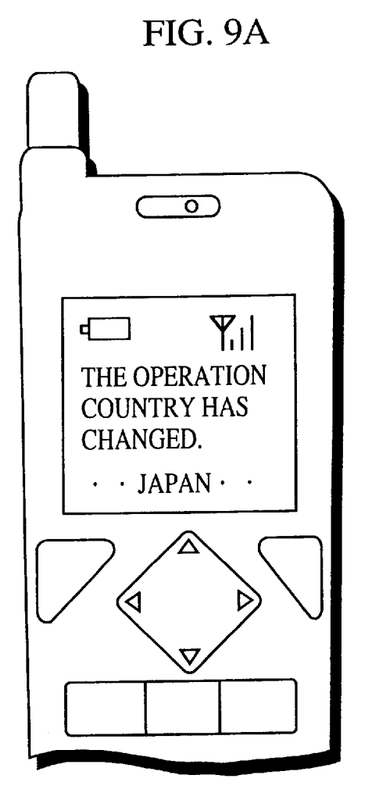
FIG. 9A shows a display example of the operation country when the operation country has been selected from a displayed list of operation country candidates.

FIG. 9A shows an example display when "Japan" is selected as the operation country by an enter key being depressed when "Japan" is highlighted. As in the case in FIG. 7, the country name "Japan" is displayed with the character string "The operation country has changed."

Figure 9B:
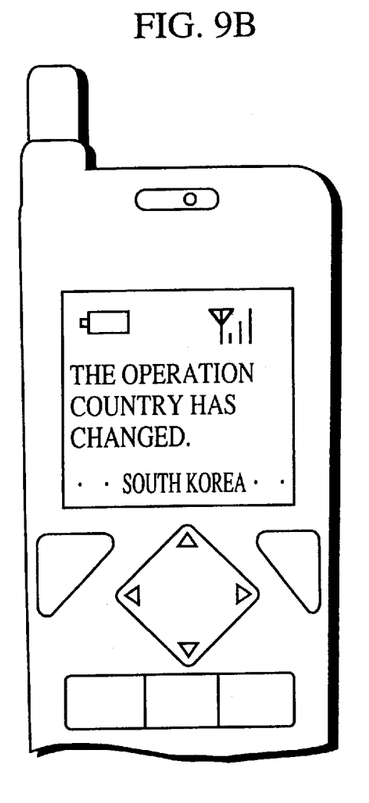
FIG. 9B shows a display example of the operation country when the operation country has been selected from a displayed list of operation country candidates.

FIG. 9B shows an example display when "South Korea" is selected as the operation country by an enter key being depressed when "South Korea" is highlighted. As in the case in FIG. 7 the country name "South Korea" is displayed with the character string "The operation country has changed."

In this way, the present embodiment obtains the time difference of an area in which a base station is situated within the mobile phone systems of Japan, South Korea and the United States from the LTM_OFF field in the Sync channel message. This time difference is approximately equivalent to the time difference of the area in which the portable telephone apparatus is located. When the portable telephone apparatus is taken to a second country, if the message processing unit 5 displays, based on this time difference, one of the plurality of country names stored in the country name dictionary storage unit 2, the user can make the necessary settings for use in that country. If these settings are performed correctly the use of the portable telephone apparatus in the second country becomes possible, even if various communication services such as call charge billing, e-mail and the Internet are different, making international roaming possible.

Note that in the present embodiment a plurality of country names is stored in the country name storage unit 2 and displayed, but symbols that are simplifications of national flags may also be used. Furthermore, abbreviations of country names such as "US" for the United States or "JP" for Japan may also be used.

What is claimed is:

1. A portable telephone comprising:
    country information storage means having a plurality of pieces of country information for a plurality of countries, each piece of country information corresponding to a time difference for each of the plurality of countries with reference to a predetermined time zone;
    reception means for receiving a message generated by a base station;
    reading means for reading from the received message a local offset showing a time difference for an area in which the base station is located;
    display means for retrieving a piece of country information corresponding to a time difference closest to the read local offset from the country information storage means, and displaying the retrieved one;
    operation country storage means storing a piece of information indicating an operation country;
    judging means for judging whether the piece of country information having a time difference closest to the local offset matches the piece of operation country information, wherein the display means displays the piece of country information, only when the judging means judges not to match;
    updating means for updating the piece of information stored in the operation country storage means, with the piece of country information having the time difference closest to the local offset, only when the judging means judges not to match;
    receiving means for receiving, when two or more pieces of country information are displayed by the display means, a selection operation from a user to select one,
    wherein the updating means updates the piece of information stored in the operation country storage means, with the one piece of country information selected by the operator.

2. A portable telephone apparatus according to claim 1, wherein the display means displays notification that the operation country has changed only when the judging means judges not to match.

3. A portable telephone apparatus comprising:
    country information storage means having a plurality of pieces of country information for a plurality of countries, each piece of country information corresponding to a time difference for each of the plurality of countries with reference to a predetermined time zone;
    reception means for receiving a message generated by a base station;
    reading means for reading from the received message a local offset showing a time difference for an area in which the base station is located;
    display means for retrieving a piece of country information corresponding to a time difference closest to the read local offset from the country information storage means, and displaying the retrieved one;
    operation country storage means storing a piece of information indicating an operation country;
    judging means for judging whether the piece of country information having a time difference closest to the local offset matches the piece of operation country information, wherein the display means displays the piece of country information and notification that the operation country has changed, only when the judging means judges not to match; and receiving means for receiving, when two or more pieces of country information are displayed by the display means, a selection operation from a user to select one, wherein the updating means updates the piece of information stored in the operation country storage means, with the one piece of country information selected by the operator.

4. A portable telephone apparatus according to claim 3, comprising:

updating means for updating the piece of information stored in the operation country storage means, with the piece of country information having the time difference closest to the local offset, only when the judging means judges not to match.

* * * * *